(12) United States Patent
McDonald

(10) Patent No.: US 7,503,136 B1
(45) Date of Patent: Mar. 17, 2009

(54) TACK MAP

(75) Inventor: Donald McDonald, Celebration, FL (US)

(73) Assignee: McDonald Financial Services, Inc., Celebration, FL (US)

( * ) Notice: Subject to any disclaimer, the term of this patent is extended or adjusted under 35 U.S.C. 154(b) by 547 days.

(21) Appl. No.: 11/103,666

(22) Filed: Apr. 12, 2005

(51) Int. Cl.
*G09F 7/06* (2006.01)

(52) U.S. Cl. .............................. 40/657; 40/621; 434/430

(58) Field of Classification Search ................. 434/430, 434/153, 150, 407; 40/718, 645
See application file for complete search history.

(56) References Cited

U.S. PATENT DOCUMENTS

| | | | | |
|---|---|---|---|---|
| 641,283 A * | 1/1900 | Evans | ........................ | 434/407 |
| 692,029 A | 1/1902 | Philipps et al. | | |
| 762,492 A | 6/1904 | Philipps et al. | | |
| 1,464,753 A | 8/1923 | Denoyer | | |
| D111,186 S | 6/1938 | Muller | | |
| 3,456,373 A | 7/1969 | Epton | .......................... | 40/124 |
| 4,402,151 A | 9/1983 | Medow | ....................... | 40/569 |
| 4,627,199 A | 12/1986 | Capaul | ........................ | 52/145 |
| 4,893,425 A | 1/1990 | Ellis | ........................... | 40/622 |
| 4,937,181 A | 6/1990 | Rogers | ...................... | 434/150 |
| 5,384,999 A * | 1/1995 | Roche et al. | .................. | 52/764 |
| 5,800,182 A | 9/1998 | Carson et al. | ............... | 434/430 |
| 5,989,676 A | 11/1999 | Davis et al. | ................... | 428/83 |
| 2004/0003525 A1 | 1/2004 | Daryabagi et al. | ............ | 40/584 |
| 2006/0150454 A1* | 7/2006 | Kang | ........................... | 40/621 |

* cited by examiner

*Primary Examiner*—Cassandra Davis
(74) *Attorney, Agent, or Firm*—Brian S. Steinberger; Law Offices of Brian S. Steinberger, P.A.

(57) ABSTRACT

A bulletin board having a map printed on an outer fabric layer, that is bonded to a tack-receptive layer, such as cork, which is bonded to a rigid backing layer such as foam. The sandwiched layers can be trimmed to fit within a metal and/or wood frame. The bonding of the layers can be by pressure activated liquid adhesive. The bonding between the layers can be done by a heat activated adhesive.

2 Claims, 4 Drawing Sheets

TACK MAP

This invention relates to boards, in particular to bulletin type board for attaching pins, tacks, staples, memos, notes, pads, and the like, having a map face surface on a fabric layer with cork type tack-receptive layer, and rigid foam backing layer bonded and/or adhered to one another within a frame and to methods of making a novel board.

BACKGROUND AND PRIOR ART

Bulletin type boards have been proposed over the years to hang various materials thereon. These boards have generally centered on being primarily cork material or cardboard type material. However, these known boards are not known for durability. Many of these boards do not last over time, and are often destroyed after limited use.

Additionally, these boards are not aesthetically pleasing and are not suitable for offices and classrooms and even living rooms, and the like.

Maps have been made over the years and are generally require paper type products that must be unfolded to be hung on a wall. Listing travel points and/or specific locations is often difficult since tacks and pins cause holes in the paper maps causing the maps to rip and become unusable over time. In addition, pushing pins through a paper map mounted on a wall may cause damage to the wall.

Laminated push pin maps have been proposed over the years. However, these types of maps have been known to be cheaply constructed and have short life spans. They also have the added detriment of having no tack receptive layer beneath them; requiring the user to either hang the map on an existing, traditional bulletin board or risk damage to walls to which the map would need to be attached.

The inventor is aware of general patents in this field. See for example, U.S. patents: U.S. Pat. No. 692,029 to Philipps; U.S. Pat. No. 762,492 to Philippes; U.S. Pat. No. 1,464,753 to Denoyer; U.S. Pat. No. 4,402,151 to Epton; U.S. Pat. No. 4,627,199 to Capaul; U.S. Pat. No. 4,893,425 to Ellis; U.S. Pat. No. 4,937,181 to Rogers; U.S. Pat. No. 5,800,182 to Carson et al.; U.S. Pat. No. 5,989,676 to Davis et al.; U.S. Pat. No. D111,186 to Miller and U.S. Published Patent Application 2004/0003525 to Daryabagi et al.

However, none of these cited patents overcomes the problems with the prior art described above.

Thus, the need exists for solutions to the above problems with the prior art.

SUMMARY OF THE INVENTION

A primary objective of the present invention is to provide a versatile bulletin board and method of making the board that has a dual use as a geography tool.

A secondary objective of the present invention is to provide a versatile bulletin board and method of making the board that is both attractive and when hung has the appearance as being a piece of art.

A third objective of the present invention is to provide a versatile bulletin board and method of making the board that can be used in a classroom, office, den, study or student's room.

A fourth objective of the present invention is to provide a versatile bulletin board and method of making the board that can be used as a geography tool to identify any town, city, state, region, union and/or nation in the world, as well as those in outer space.

A fifth objective of the present invention is to provide a versatile bulletin board and method of making the board that can be used to identify storms such as hurricanes, and the like.

A sixth objective of the present invention is to provide a versatile bulletin board tool and method of making the board that can be used by businesses such as, but not limited to, restaurants and sales organizations to track and mark locations, sales territories, and the like.

A seventh objective of the present invention is to provide a versatile bulletin board tool and method of making the board that can be used not only as map, but also as a bulletin or tack board for the display and hanging of items such as, but not limited to, memos, notes and messages; using tacks or pins.

A preferred embodiment of the novel invention can include a map indicia that is printed on heavy weight oxford type fabric, that can be bonded to a cork layer, which is then bonded to a rigid backing board, such as but not limited to foam board, and the like. All the layers can then be encased in a frame such as a laminated wood frame and/or metal frame, and the like.

The methods of making the novel invention can include bonding the different layers by using a heat activated adhesive between the different layers.

Another method of making the novel invention can include bonding the layers by a liquid adhesive between the layers.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

Figure 1:
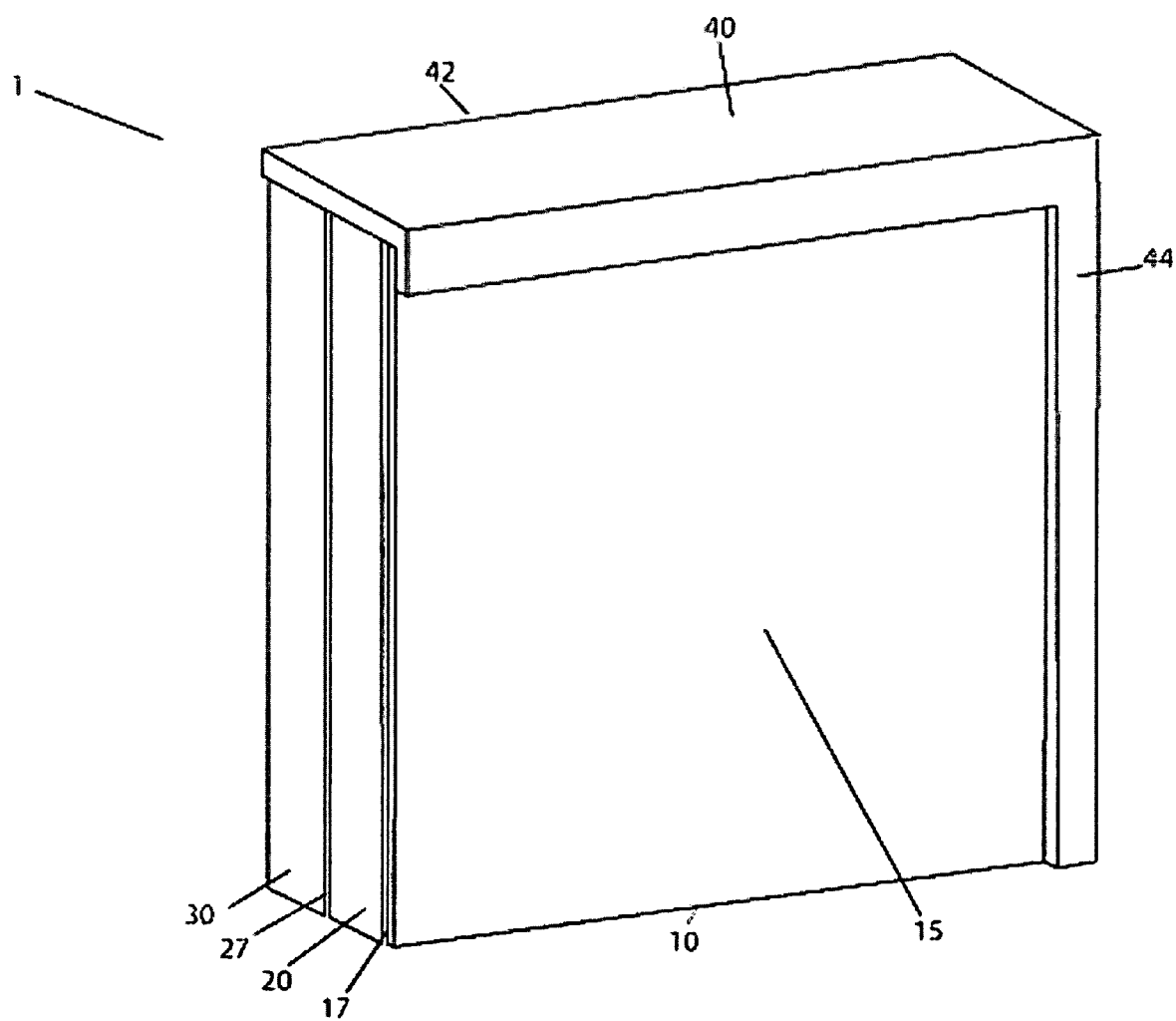
FIG. 1 is a prospective view of the novel board invention with partial cut-away of the surrounding frame.

FIG. 1 is a prospective view of the novel board invention 1 with partial cut-away of the surrounding frame 30. Referring to FIG. 1, the novel bulletin board invention can include a first top layer 10 such as a heavy weight oxford type fabric.

Examples of appropriate fabrics include, but are not limited to, heavyweight, printable fabrics (oxfords, canvas, etc.) with a reasonably open weave such as Fisher Textiles Pixel Perfect™ 7 oz. Polyester Oxford fabric, and the like.

Printed on the outer face of the fabric can be geographical map indicia, such as a view of a state, region, union and/or nation in the world. The print used can be a waterproof permanent marking type ink, and the like.

The ink can be applied to the fabric by any appropriate means of fabric printing including, but not limited to inkjet printing using either pigment or dye-based inks.

Below the fabric layer 10 can be a tack receptive material layer 20 such as preferably an approximately ¼" inch thick cork, and the like. This layer 20 is receptive for pins, tacks, and the like.

Appropriate cork or cork like materials include, but are not limited to, almost any grade of natural cork sheeting (such as Cork-14) or any pin receptive cork substitutes or artificial cork sheeting products.

The fabric layer 10 can be bonded therebetween 17 to the tack receptive layer 20 by heat activation and/or pressure liquid activation as will be described later.

Beneath the tack receptive layer 20 can be a rigid backing board 30 preferably a foam board, and the like.

Appropriate backing boards include, but are not limited to, commercial paper, plastic, or foil covered foam-core board of varying thicknesses depending on the size of the board being created, chipboard of varying thicknesses, corrugated cardboard, or corrugated plastics.

The tack receptive layer 20 can be bonded therebetween 27 to the rigid backing board 30 by heat activation and/or pressure liquid activation as will be described later.

Surrounding the four sided outer perimeter edges of the invention 1 can be a frame 40 having a side portion 42 and front edge portion 44. The frame 40 can be formed from metal and/or a solid or laminated type wood. The frame can have various finishes such as but not limited to white, black, cherry wood, walnut and mahogany, and the like.

When tack map is completed and in use, pins or tacks can be pushed through the outer fabric layer with no (or minimal) damage to the fabric, due to the looser weave nature of the materials used and the resiliency of woven fabric. The pin then penetrates the cork beneath the fabric which, due to its "tack-receptive" properties, gribs the pin shaft and holds it in place. Longer pins can also penetrate the bottom foam layer (if foam is used—a rigid backing board would stop the pins penetration), but will not cause damage, due to the fact that the foam board is porous and is permanently bonded to the flexible cork and held in place by the surrounding frame.

Some pin holes may be observed in the fabric, due to spreading of the fabric fibers, but these will tend to "heal" as cork (to which the fabric is tightly and permanently bonded) has a resilient "healing" property that allows it to return to previous form.

Figure 2:
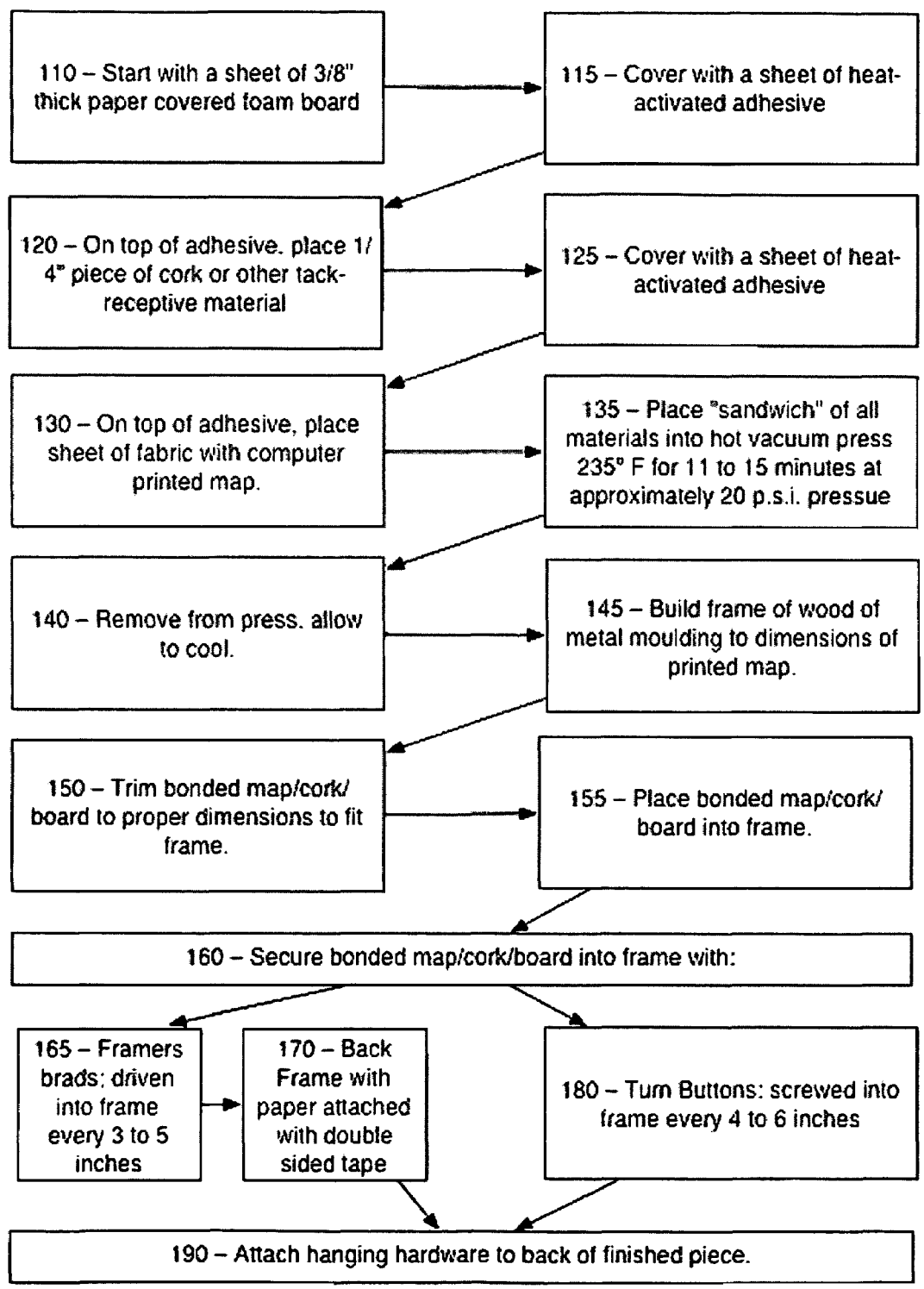
FIG. 2 is a flow chart showing a preferred method of making the novel board of FIG. 1 by bonding the layers together with a heat activated adhesive.

FIG. 2 is a flow chart showing a preferred method 100 of making the novel board 1 of FIG. 1 by bonding the layers together with a heat activated adhesive.

Step 110 starts with a sheet of approximately ⅜ inch thick paper covered foam board (30 in FIG. 1). Next, in step 115, the sheet covered board is covered with a sheet of heat-activated adhesive.

Examples of appropriate heat activated sheet adhesives include, but are not limited to, Versamount™ from The Print Mount Company or Fusion™ by Seal, and the like.

In step 120, on top of adhesive, place approximately ¼ inch piece of cork or other type of tack-receptive material (20 FIG. 1). Step 125 cover with another sheet of heat-activated adhesive. Step 130 on top of adhesive, place sheet of fabric 10 with a map 15 that can be printed thereon by a computer.

Step 135 is where the "sandwich" of all the materials is then placed into a hot vacuum press.

Examples of appropriate hot vacuum presses include, but are not limited to, hot vacuum presses made by Seal or The Print Mount Company, and the like.

The press can be heated to approximately 235 degrees F. for approximately 11 to approximately 15 minutes at a pressure of approximately 20 psi (pounds per square inch).

Step 140 has the "sandwich" removed from the press, and allowed to cool over time to room temperature.

Step 145 has a frame (40 FIG. 1) that is assembled of wood and/or metal molding to encompass the dimensions of the printed map.

Step 150 is to trim the bonded "sandwich" map/cork/board to dimensions of the selected frame size. And step 155 has the trimmed map/cork/board placed into the frame 40. Securing the trimmed map/cork/board 160 can be done by framers brads: driven into the frame every approximately 3 to approximately 5 inches, followed by step 170 applying a paper to the back of the assembled board as a back frame with double sided tape, and step 190 attach hanging hardware fasteners, such as hooks, nails, and the like to the back edges of the finished board assembly.

Securing can also occur by turn buttons, step 180 where button type screws are screwed into the frame approximately every 4 to approximately every 6 inches, followed by the attach hanging fastener step 190. This method of securing offers the added benefit of allowing the easy replacement of the map/cork/board should it become soiled or outdated.

Figure 3:
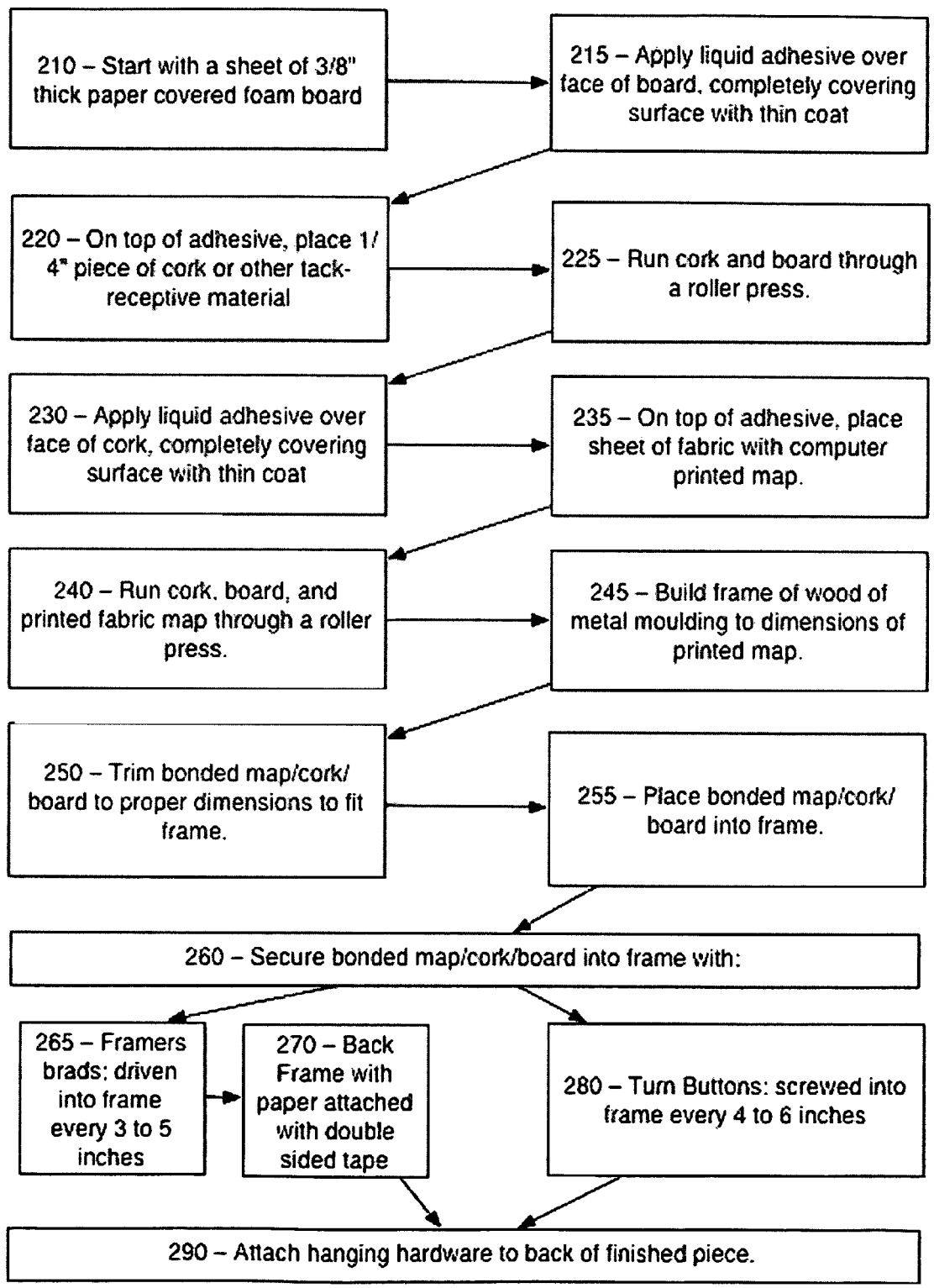
FIG. 3 is a flow chart showing another preferred method of making the novel board of FIG. 1 by bonding the layers together with a liquid adhesive.

FIG. 3 is a flow chart 200 showing another preferred method of making the novel board of FIG. 1 by bonding the layers together with a liquid adhesive.

Step 210 starts with a sheet of approximately ⅜ inch thick paper covered foam board (30 in FIG. 1). Next, in step 215, the sheet covered board is covered with a liquid adhesive that can be applied over the face of the board, completely covering the surface with a thin coat.

Examples of appropriate adhesives include, but are not limited to, 3M™ Fastbond™ Water-Based Industrial Adhesive 4213-NF or 3M™ Scotch-Grip™ Pressure Sensitive Adhesive 4224-NF, and the like.

In step 220, on top of adhesive, place approximately ¼ inch piece of cork or other type of tack-receptive material (20 FIG. 1). Step 225, the tack receptive material and the backing board through a roller press device that is capable of generating between approximately 15 to approximately 20 p.s.i. (pound per square inch).

Step 230 is a liquid adhesive that can be applied over the face of the tack receptive material layer, completely covering the surface with a thin coat.

Step 235 has on top of adhesive, place sheet of fabric 10 with a map 15 that can be printed thereon by a computer, screen printing, and the like.

Step 240 has the "sandwich" of the tack receptive board, backing board and printed fabric map face being run through the roller press device that is capable of generating between approximately 15 to approximately 20 p.s.i. (pound per square inch).

Step 245 has a frame (40 FIG. 1) that is assembled of wood and/or metal molding to encompass the dimensions of the printed map.

Step 250 is to trim the bonded "sandwich" map/cork/board to dimensions of the selected frame size. And step 255 has the trimmed map/cork/board placed into the frame 40. Securing the trimmed map/cork/board 260 can be done by framers brads: driven into the frame every approximately 3 to approximately 5 inches, followed by step 270 applying a paper to the back of the assembled board as a back frame with double sided tape, and step 290 attach hanging hardware fasteners, such as hooks, nails, and the like to the back edges of the finished board assembly.

Securing can also occur by turn buttons, step 280 where button type screws are screwed into the frame approximately every 4 to approximately every 6 inches, followed by the attach hanging fastener step 290. This method of securing offers the added benefit of allowing the easy replacement of the map/cork/board should it become soiled or outdated.

Figure 4:
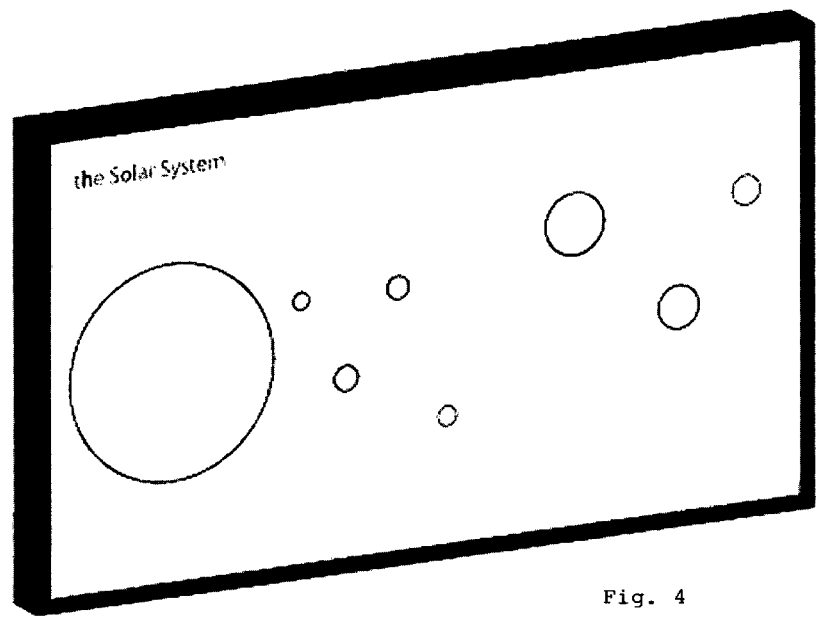
FIG. 4 shows a world map indicia with the board invention.
Figure 5:
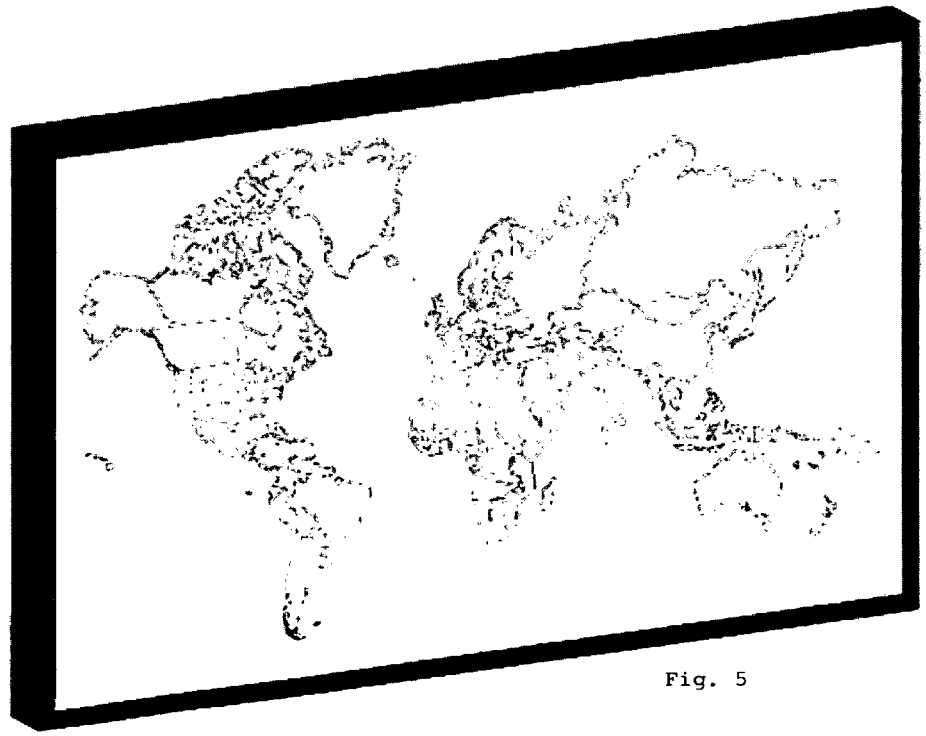
FIG. 5 shows a galactic map indicia with the board invention.

Although various geographical locations have been described on the fabric cover of the board invention, maps can also include, but not be limited to, outer space such as but not limited to galaxies, stars, planets, and the like. FIG. 4 shows a world map indicia with the board invention. FIG. 5 shows a galactic map indicia with the board invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A bulletin board of sandwiched materials that are tightly and permanently bonded to one another by heat and pressure activated bonding layers, consisting of:

an open weave fabric outer layer having a front surface with a map indicia permanently printed thereon, and a rear surface;

a tack-receptive cork board having a front surface and a rear surface;

a heat and pressure activated adhesive layer between the rear surface of the open weave fabric outer layer and the front surface of the tack-receptive cork board, so that a pressure source and heat source is used for tightly and permanently bonding substantially all of the rear surface of the open weave fabric outer layer to substantially all of the front surface of the tack-receptive cork board;

a rigid backing paper covered foam core board having a front surface and a rear surface;

another heat and pressure activated adhesive layer between the rear surface of the tack-receptive cork board and the front surface of the rigid backing paper covered foam core board, so that the pressure source and the heat source is used for tightly and permanently bonding substantially all of the rear surface of the tack-receptive cork board to the front surface of the rigid backing paper covered foam board, wherein the board is useful for holding tacks and pins thereon, and wherein the tightly and permanently bonding of the open weave fabric outer layer to the tack-receptive cork board allows for holes formed from the tacks and the pins to heal and return to previous form when the tacks and the pins are removed from the open weave fabric outer layer of the bulletin board; and a frame encompassing perimeter side edges of the board.

2. A bulletin board of sandwiched materials that are tightly and permanently bonded to one another by liquid and pressure activated bonding layers, consisting of:

an open weave fabric outer layer having a front surface with a map indicia permanently printed thereon, and a rear surface;

a tack-receptive cork board having a front surface and a rear surface;

a liquid and pressure activated adhesive layer between the rear surface of the open weave fabric outer layer and the front surface of the tack-receptive cork board, so that a pressure source is used for tightly and permanently bonding substantially all of the rear surface of the open weave fabric outer layer to substantially all of the front surface of the tack-receptive cork board; and a rigid backing paper covered foam core board having a front surface and a rear surface;

another liquid and pressure activated adhesive layer between the rear surface of the tack-receptive cork board and the front surface of the rigid backing paper covered foam core board, so that the pressure source is used for tightly and permanently bonding substantially all of the rear surface of the tack-receptive cork board to the front surface of the rigid backing paper covered foam board, wherein the board is useful for holding tacks and pins thereon, and wherein the tightly and permanently bonding of the open weave fabric outer layer to the tack-receptive cork board allows for holes formed from the tacks and the pins to heal and return to previous form when the tacks and the pins are removed from the open weave fabric outer layer of the bulletin board; and a frame encompassing perimeter edges of the board.

* * * * *